United States Patent [19]

Hamilton

[11] Patent Number: 4,948,269
[45] Date of Patent: Aug. 14, 1990

[54] BEARING TEMPERATURE REGULATION AND LUBRICATION SYSTEM

[76] Inventor: James T. Hamilton, 328 Sycamore Dr., Naperville, Ill. 60540

[21] Appl. No.: 378,050

[22] Filed: Jul. 11, 1989

[51] Int. Cl.$^5$ ............................................. F16C 37/00
[52] U.S. Cl. ...................................... 384/467; 384/476
[58] Field of Search ............... 384/467, 476, 313, 316, 384/317, 321

[56] References Cited

U.S. PATENT DOCUMENTS

| | | |
|---|---|---|
| 2,173,489 | 9/1939 | Voight . |
| 2,346,805 | 4/1944 | Whiteley . |
| 2,352,206 | 6/1944 | Kendall ................................ 384/476 |
| 2,747,945 | 5/1956 | Fulton .................................. 384/467 |
| 2,748,863 | 3/1958 | Benton . |
| 2,755,989 | 7/1956 | Coward . |
| 3,355,974 | 12/1967 | Carmichael . |
| 3,707,102 | 12/1972 | Huppenthal et al. . |
| 4,027,928 | 6/1977 | Williams . |
| 4,402,559 | 9/1988 | Shibata et al. . |

Primary Examiner—Lenard A. Footland
Attorney, Agent, or Firm—Lee, Mann, Smith, McWilliams & Sweeney

[57] ABSTRACT

A bearing temperature regulation and lubrication system is provided including a lubricating fluid which may be heated or cooled, one or more bearings disposed within a hollow chamber of a bearing housing, the bearing housing having an inlet and an outlet for allowing the fluid to circulate through the hollow chamber around the roller bearing and races, a pump for circulating the fluid, a fluid circulation and heating loop having a heater for heating the fluid, a fluid-cooling circulation loop having a chiller for cooling the fluid, solenoid valves for engaging or disengaging the circulation of fluid through each of the circulation loops, a thermostat for monitoring the temperature of the bearings and for selectively operating the solenoid valves and electric heater.

20 Claims, 3 Drawing Sheets

BEARING TEMPERATURE REGULATION AND LUBRICATION SYSTEM

BACKGROUND OF THE INVENTION

The present invention relates to a system for extracting the friction-generated heat from a preloaded roller bearing before the heat migrates into the bearing itself and surrounding components of the associated machine. More particularly, the invention is directed to a system which can maintain bearing temperature within an extremely narrow range, usually less than $+/-\frac{1}{2}°$ F. during operation of the associated machine.

Heat is mechanically generated by bearings during their operation due to friction and interference fit from preloading between the bearing elements. This mechanically generated heat is capable of raising the temperature of the bearings to a level where the bearing elements will become strained and deformed thereby adversely effecting the life of the bearing and the machine, as well as the accuracy of the machine. The heat generated by the bearings will also be conducted to other parts of the machine thereby causing additional deleterious effects to the operation and accuracy of the machine.

While bearings may be cooled to avoid the adverse consequences of overly high bearing temperatures, the over-cooling of bearings may also have adverse consequences on the operation of a machine. Over-cooling of a bearing will effect the fit between the bearing elements causing changes in the axis of rotation of the rotating member. Over-cooled bearings will also conduct heat away from adjacent areas of the machine thereby causing changes in the fit between other parts of the machine.

The present invention is particularly well suited for a two cylinder rotary die cutter which cuts or perforates material passing between two rotating cylinders. Such a machine requires that close tolerances be uniformly maintained between and along the length of the rotating cylinders for proper operation. Over-cooling or over-heating the bearings supporting each rotating cylinder can cause changes in the location of the axis of rotation of the cylinder which in turn effects the tolerances between the cylinders. The over-cooling or over-heating of the bearings will also cause heat to be conducted towards or away from other parts of the machine, such as the ends of each cylinder thereby causing a nonuniform expansion or contraction of the cylinders and adversely effecting the machines operation.

Various devices and systems have been used to absorb or dissipate the heat generated by bearings thereby cooling the bearings. These prior devices have been used to maintain the bearing temperature below a maximum temperature. Such devices are shown in the U.S. Pat. Nos. 2,173,489; 2,346,805; 2,755,989; 4,027,928; and 4,402,559. Other devices have been used to cool a rotating cylinder. Such devices are shown in U.S. Pat. Nos. 2,748,863; 3,359,974; and 3,707,012. However, none of these devices disclose a system in which the bearing temperature may be regulated and maintained at a desired temperature, or within a desired range of temperatures.

SUMMARY OF THE INVENTION

The present invention provides a system for the lubrication and temperature regulation of bearings. A temperature controlled lubricating fluid is circulated through a hollow chamber within the bearing housing which encloses one or more bearings. The lubricating fluid is continuously circulated by a pump through the hollow chamber and around, and in contact with, the bearings to provide lubrication between the bearing parts. A thermostat monitors the temperature of the fluid as it exits the bearing. The thermostat is set with a desired preselected bearing operating temperature or with a range of temperatures having an upper and a lower operating temperature. The thermostat controls solenoid valves which will route the circulated fluid to the housing means alternatively through either a fluid circulation and heating loop, which includes a heater for heating the fluid, or through a fluid-cooling circulation loop which includes a chiller for cooling the fluid. A recirculation cooling loop is also provided including a second pump for continuing to circulate a portion of the fluid through the chiller while the remaining fluid is being circulated through the fluid circulation and heating loop.

When the thermostat detects a bearing temperature above a preselected temperature, the thermostat will close the solenoid valves in the fluid circulation and heating system, and will open the solenoid valves in the fluid-cooling circulation system allowing chilled fluid to circulate through the bearing housing to cool the bearings. When the thermostat detects that the temperature of the exiting fluid is in the set range, the thermostat will close the solenoid valves in the fluid-cooling circulation loop and will open the solenoid valves in the fluid circulation (heating) loop allowing fluid to circulate through the bearing housing. If the thermostat detects that too much cooled fluid has caused a drop below the set temperature range, the thermostat will switch on the electric heater in the fluid circulation and heating loop until the temperature is raised to within the set range of the thermostat. When this is reached, the thermostat shuts the heater off. The thermostat will continue to selectively circulate fluid through the bearing housing and selectively introduce heated or chilled fluid as needed to maintain the temperature of the bearings at a desired temperature or within a desired range of temperatures.

DETAILED DESCRIPTION OF THE INVENTION

It must be understood that while the present invention is described in the disclosed embodiment as applied to the bearings in a two cylinder rotary die cutter machine having four bearing housings, that this is merely for purposes of illustration and that the invention is equally applicable to any bearing means which supports a rotating member regardless of the nature of the device, apparatus or equipment of which the rotating member is a part thereof and regardless of the number of bearing housings utilized.

Figure 1:
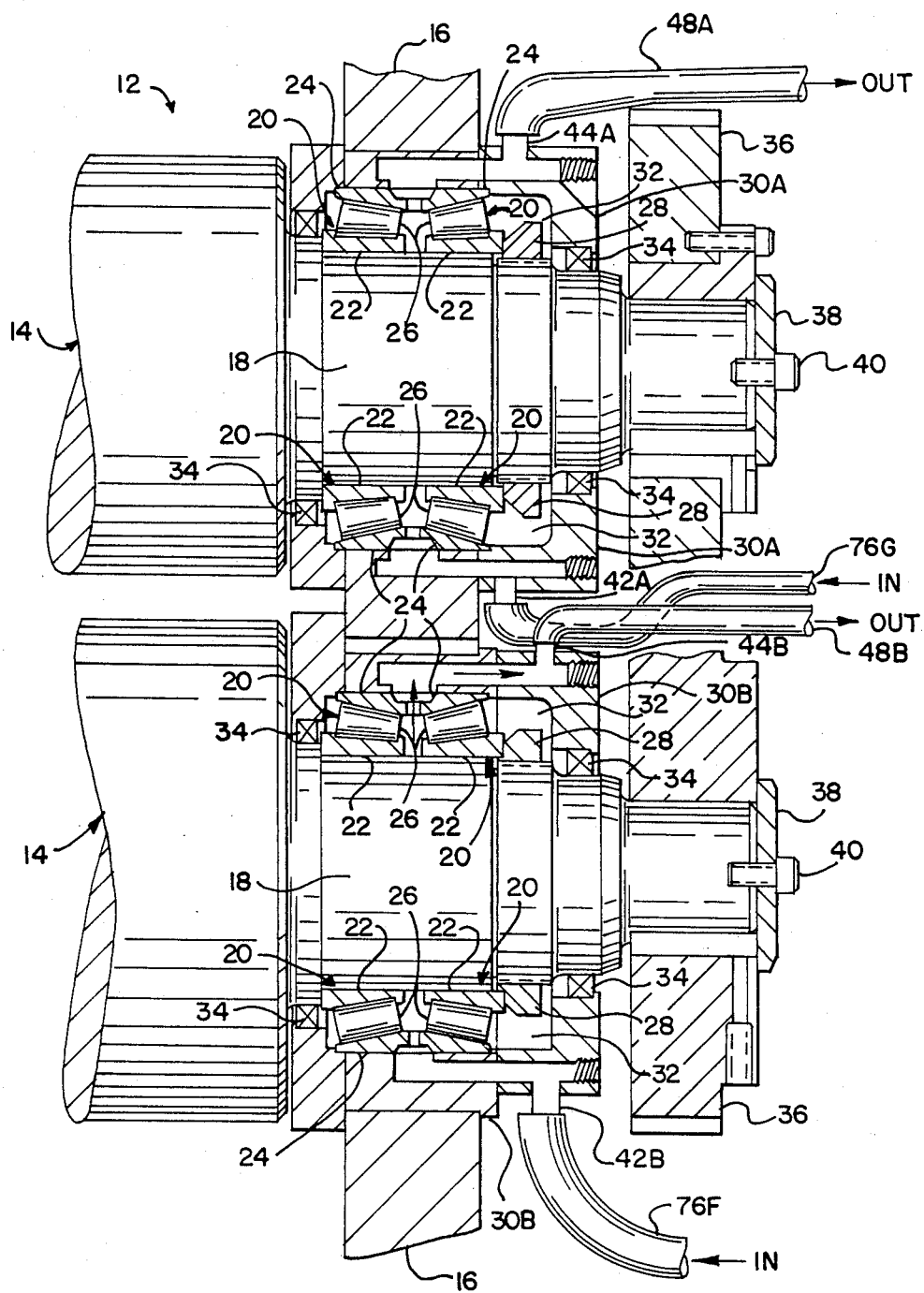
FIG. 1 is a plan view of a portion of a two cylinder rotary die cutter machine showing the bearing housing means in cross-section.
Figure 2:
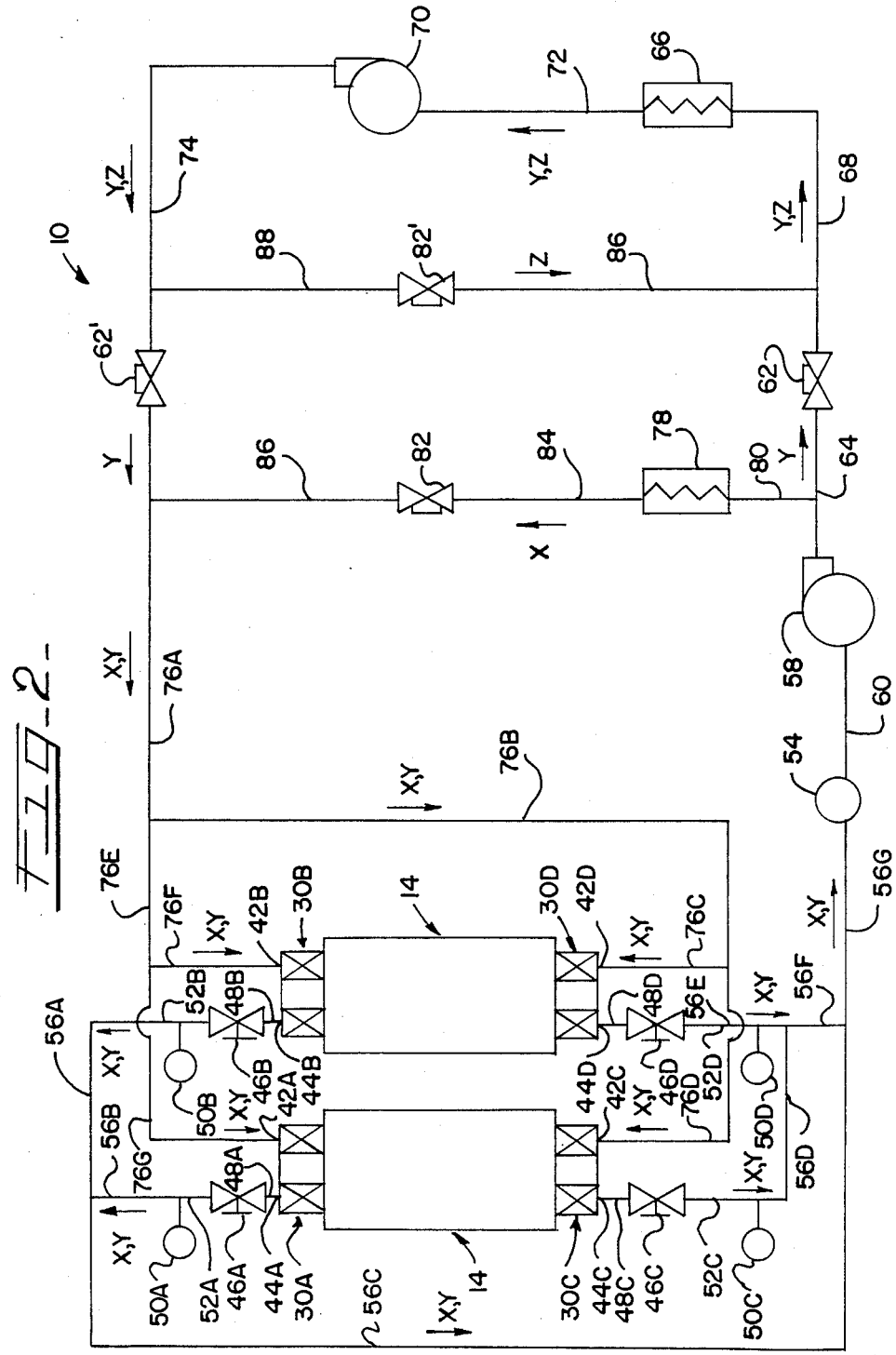
FIG. 2 is a schematic diagram of the system of the present invention.

The bearing temperature regulation and lubrication system 10 is schematically illustrated in FIG. 2. The bearing temperature regulation and lubrication system 10 is used in connection with machines having rotating parts such as a two cylinder rotary die cutter 12 which has two rotating cylinders 14. While FIG. 1 illustrates only one end of the cylinders 14, the other end of the cylinders 14 would be similar except for the absence of gears 36. The cylinders 14 have journals 18 extending from each end of the cylinders 14. The journals 18 are rotatably supported on the frame 16 of the rotary die cutter 12 by bearings 20 with each bearing 20 having an inner race 22, an outer race 24 and a plurality of rollers 26. While the illustrated bearings 20 are tapered roller bearings, the present invention is equally applicable to other types of bearings such as ball bearings.

The bearings 20 are held in place by a bearing unit nut 28 which is removably fastened to the journal 18. Bearing housings 30 A-D respectively enclose each of the bearings 20 within a hollow chamber 32 having boundaries defined by a bearing housing 30 A-D and its respective journal 18. The hollow chamber 32 is sealed fluid tight by seals 34 located between the bearing housing 30 and the journal 18. A gear 36 is fastened to a journal 18 at one end of each cylinder 14 by locking plate 38 and locking screw 40. Each bearing housing 30 A-D includes a respective inlet 42 A-D and a respective outlet 44 A-D which allow a lubricating fluid to be circulated through the hollow chamber 32 and around the bearings 20 to lubricate the bearings 20 and to either cool or heat the bearings 20.

Each outlet 44 A-D is connected in fluid communication to a respective hand valve 46 D-D by tubing 48 A-D. Each hand valve 48 A-D is connected in fluid communication with a respective temperature gauge 50 A-D by tubing 52 A-D. Each temperature gauge 50 A-D is connected in fluid communication with a thermostat 54 by tubing 56 A-G. The thermostat 54 is connected in fluid communication with a first pump 58 by tubing 60. The first pump 58 is connected in fluid communication with a solenoid valve 62 by tubing 64. The solenoid valve 62 is connected in fluid communication with a chiller 66 by tubing 68. The chiller 66 is connected in fluid communication with a second pump 70 by tubing 72. The second pump 70 is connected in fluid communication with a solenoid valve 62' by tubing 74. Solenoid valve 62' is connected in fluid communication with inlets 42 A-D of the bearing housings 30 A-D by tubing 76 A-E. A heater 78 is connected in fluid communication with tubing 64 by tubing 80 and with solenoid valve 82 by tubing 84. Solenoid valve 82 is connected in fluid communication with tubing 76A by tubing 86. Solenoid valve 82' is connected in fluid communication with tubing 68 by tubing 86 and with tubing 74 by tubing 88. The thermostat 54 is in electrical communication with each solenoid valve 62, 62', 82 and 82'.

The above arrangement of elements provides for a fluid circulation loop, including a selectively operable heating means, having a route indicated by the letter "X" adjacent to an arrow, a fluid-cooling circulation loop having a route indicated by the letter "Y" adjacent to an arrow, and a recirculation cooling loop whose route is indicated by the letter "Z" adjacent to an arrow, wherein said arrows indicate the direction of fluid circulation.

The preferred fluid for use in the bearing lubrication and temperature regulation system 10 is ethylene glycol and water mixture having a substantially higher specific heat than commonly used oil lubricants and coolants. Use of ethylene glycol and water is preferred over the oils normally used as lubricants-coolants, as the ethylene glycol and water mixture has a specific heat of 0.8, which allows it to absorb or release more heat per degree of temperature change than can the normally used oils having a specific heat of about 0.5, while also providing proper lubrication to the bearings 20. The ethylene glycol and water mixture has a substantially lower viscosity than commonly used lubricating oils which allows for substantially elevated volumes of fluid circulation without raising the fluid pressure in the circulation loop. The faster that the liquid moves around the circulation loop, the more efficiently the whole system will work, specifically: (a) The thermostat will respond more quickly to an out-of-range temperature sensed at the point where the fluid exits from the bearings; (b) The more quickly the corrective action, whether a cooling or a heating, can occur; and (c) The more frequently the system cycles, the closer the bearing temperature will be held within the set range. In one test comparing identical rotary die cutting machinery and bearings firstly using prior art oil lubricant-cooling which can effectively pump only 1 gallon per minute due to viscosity pressure, and secondly employing the present invention pumping about 5 to 6 gallons per minute of circulating ethylene glycol water mixture to each bearing: it was found that the prior art system would cycle only once an hour and deleteriously allow the bearing temperatures to develop 10 to 20 degree (°F.) temperature increases, whereas when using the present invention, cycling of about 15 seconds was made and held bearing temperatures to within $+/-\frac{1}{4}$ degree (°F.) for bearings running at identical 100 rpm rates. Both systems had thermostat settings of $+/-1°$ F.

All of the tubing may be made of low pressure rubber hosing, or metal or plastic piping. The tubing and the pumps should be sized so as to circulate approximately 3-6 gallons of fluid per minute per bearing through each bearing housing 30 A-D as distinguished over the 1 gallon per minute rate for conventional cooling systems. The piping or tubing, and the pump sizes, for the system 10 are sized to provide for the highest possible fluid flow rate without exceeding the maximum allowable bearing seal pressures. The higher the flow rate, the more narrowly the bearing temperature will be held within the set or desired range. The chiller 66 has a cooling capacity sufficient to handle the heat load. With the bearings 20 operating at 0 to 1000 revolutions per minute, the bearing operating temperature is preferably maintained at about 70° F or average room temperature.

The thermostat 54 controls the operation of the fluid circulation and heating loop X and the fluid-cooling circulation loop Y. The thermostat 54 is preferably located near the outlets 44 A-D of the bearing housings 30 A-D so that the temperature of the fluid may be immediately monitored as it leaves the bearing housings 30 A-D thereby indicating the temperature of the bearings 20 within the bearing housings 30 A-D. The thermostat 54 is set to a desired temperature, or temperature range, at which the bearings 20 are to operate. When the thermostat 54 indicates that the temperature of the bearings 20 is above the preselected limit, the thermostat 54 will close solenoid valves 82 and 82' and will open solenoid valves 62 and 62' thereby engaging the fluid-cooling circulation loop Y. During operating of the fluid-cooling circulation loop Y, the first pump 58, and the second pump 70 circulate fluid through the chiller 66, where the fluid is cooled, and through the hollow chamber 32 of the bearing housings 30 A-D, where the fluid absorbs the heat generated by the bearings 20 and thereby quickly cools the bearings 20 and any surrounding parts of the machine 12.

When the thermostat 54 indicates that the temperature of the bearings 20 is below a preselected level, such as when the bearings have been over-cooled by the fluid-cooling circulation loop Y, the thermostat 54 will close solenoid valves 62 and 62' and will open solenoid valves 82 and 82' thereby engaging the fluid circulation and heating loop X and the recirculation cooling loop Z. During operation of the fluid circulation and heating loop X, the first pump 58 circulates a portion of the fluid contained in the system 10 through heater 78, where the fluid is heated if the heater 78 is activated by the thermostat 54, and then through the hollow chamber 32 of the bearing housings 30 A-D where the fluid may quickly heat the bearings 20 and any surrounding parts of the machine 12.

While the fluid circulation and heating loop X is in operation, the second pump 70 will continue to circulate, in the recirculation cooling loop Z, a portion of the fluid through the chiller 66 to continue cooling this portion of the fluid. The thermostat 54 will continue to monitor the temperature of the bearings 20, and will accordingly select between the operation of the fluid-cooling circulation loop Y and the fluid circulation and heating loop X to maintain the desired operating temperature of the bearings 20. The heater 78 will not be activated by the thermostat unless the bearings are cooled below the set range.

The temperature gauges 50 A-D are located near the outlets 44 A-D of the bearing housings 30 A-D to give individual indications of the temperature of the bearings 20 in each bearing housing 30 A-D. Each hand valve 46 A-D may be adjusted to increase or decrease the rate of flow of the fluid through each bearing housing 30 A-D thereby providing a balanced exiting fluid temperature through each bearing housing 30 A-D. The hand valve 46 A-D are adjusted by the operator based upon observation of the exiting temperature gauges. The object is to have all of the exit temperatures of the fluid from each bearing be the same.

Figure 3:
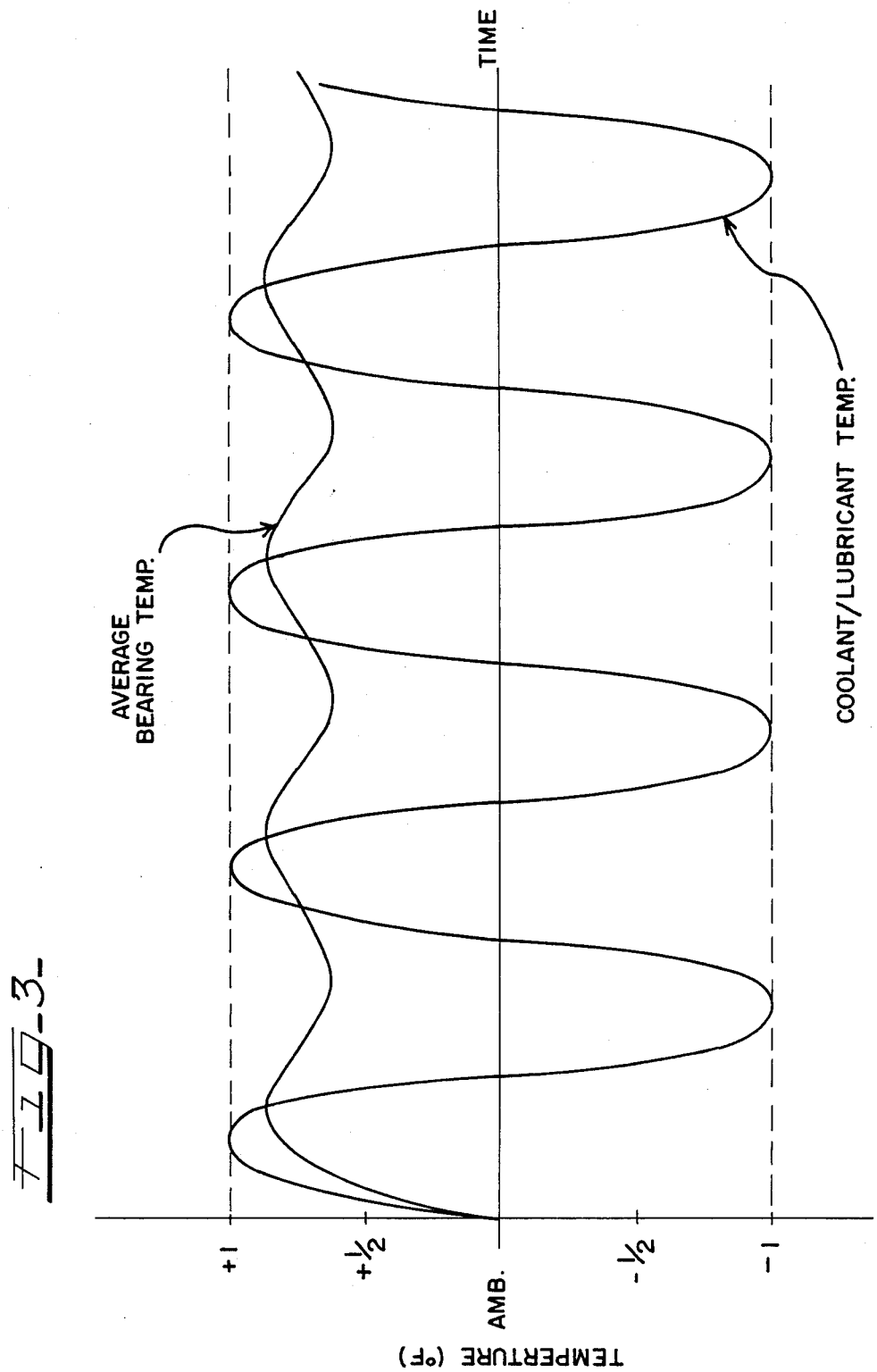
FIG. 3 is a comparative graph showing the cyclical temperature fluctuations of the coolant/lubricant and the average bearing temperature.

To better illustrate the quick response of the system 10 and the quite narrow range of temperature fluctuations that can be achieved for the coolant/lubricant, reference is now made to the comparative graph shown in FIG. 3. In FIG. 3, the 5 to 6 gallon system described in the foregoing comparison to the prior art system, included the features of the invention, and was further monitored in cooperation with the rotary die cutting machine having bearings rotating at approximately 150 revolutions per minute. Temperature curve (1) ia a plot of the change in temperature of the coolant/lubricant in the system 10 over a period of time and curve (2) is the average bearing temperature. It will be observed that the average bearing temperature fluctuates only within a small temperature range of less than $\frac{1}{4}$° F. i.e., about $+/-\frac{1}{8}$° F. The average bearing temperature (2) is slightly higher, i.e., fluctuates around a higher temperature, than the coolant/lubricant temperature. Also the bearing temperature (2) lags behind the coolant/lubricant temperature as the introduction of the cooler or warmer lubricant takes a short period of time to cool or heat the bearing as would be understood. The average bearing temperature (2) has a lower amplitude than the coolant/lubricant temperature (1). The graph shown in FIG. 3 was made during a continuous operation of the rotary die cutter machine running at a constant foot per minute feed web speed and the resulting temperature curves for the bearing and coolant/lubricant quickly reach a staggered, sinusoidal relationship following the startup at ambient conditions. The fluctuation of the bearing temperature would be above and below a set thermostat value, for example 78° F., and accordingly the bearing temperature variation would be 78° $+/-$ (or smaller) $\frac{1}{8}$° F during operation of the system 10.

Various features of the invention have been particularly shown and described in connection with the illustrated embodiment of the invention, however, it must be understood that these particular arrangements merely illustrate and that the invention is to be given its fullest interpretation with the terms of the appended claims.

What is claimed is:

1. A method of maintaining the temperature of a bearing at a preselected temperature or within a range of temperatures, which comprises:
   monitoring the temperature of said bearing;
   circulating a fluid through a chiller and then through said bearing to absorb heat from said bearing when said bearing temperature rises above a preselected first temperature; and
   circulating a fluid through a heater and then around said bearing to transfer heat to said bearing when said bearing temperature falls below a preselected second temperature.

2. A bearing temperature regulation system comprising:
   a fluid, said fluid being capable of being heated or cooled;
   bearing housing means for enclosing one or more bearings, said housing means having a hollow fluid chamber for the passage of said fluid therethrough and in fluid communication with said bearings;
   said hollow fluid chamber having inlet means and outlet means for the passage of said fluid through said hollow fluid chamber;
   thermostat means for sensing the temperature of said fluid after said fluid has passed through said housing means, and for selectively controlling the operation of a fluid-cooling circulation loop and a fluid circulation and heating loop;
   a pump for pumping said fluid through said hollow fluid chamber and through said fluid-cooling circulation loop or said fluid circulation and heating loop;
   said fluid-cooling circulation loop being in communication with said hollow fluid chamber and said pump, and including chiller means for cooling said fluid and at least one solenoid valve in communication with said thermostat means for selectively controlling the flow of chilled fluid through said hollow fluid chamber;
   said fluid circulation and heating loop being in communication with said hollow fluid chamber and said pump, and including a heater means for heating said fluid, and at least one solenoid valve in communication with said thermostat means for selectively controlling the flow of fluid from the circulation and heating loop through said hollow fluid chamber;
   said thermostat means responding to a fluid temperature reading above a preselected value to open said at least one solenoid valve of the fluid-cooling circulation loop, and closing said at least one solenoid valve of the fluid circulation and heating loop to circulate chilled fluid through said hollow fluid chamber and around said bearings to absorb heat from said bearings;

said thermostat means responding to a fluid temperature reading below a preselected value to open said at least one solenoid valve of the fluid circulation and heating loop and closing said at least one solenoid valve of the fluid-cooling circulation loop to circulate fluid from said circulation and heating loop through said hollow fluid chamber and around said bearings to transfer heat to said bearings.

3. The bearing temperature regulation system of claim 2 including a recirculation cooling loop, said recirculation cooling loop having a second pump for circulating fluid through said chiller means and back to said second pump, said recirculation cooling loop operating when said fluid circulation and heating loop is operating.

4. The bearing temperature regulation system of claim 2 wherein said fluid has a specific heat of about 0.8 or greater.

5. The bearing temperature regulation system of claim 2 wherein said fluid includes ethylene glycol and water.

6. The bearing temperature regulation system of claim 2 wherein said thermostat controls the heater means.

7. The bearing temperature regulation system of claim 2 including temperature gauges in communication with said outlet means.

8. The bearing temperature regulation system of claim 2 including flow control valves in communication with said outlet means to adjust the flow rate to the bearings.

9. The bearing temperature regulation system of claim 2 further including a plurality of bearing housing means, said fluid-cooling circulation loop and said fluid circulation and heating loop being in communication with the plurality of said bearing housing means.

10. The bearing temperature regulation system of claim 2 wherein said fluid is circulated through said bearing housing means at a rate of about 3 to 6 gallons per minute per bearing.

11. A bearing temperature regulation system comprising:

a fluid, said fluid being capable of being heated or cooled;

bearing housing means having a hollow chamber for enclosing one or more bearings within said hollow chamber;

a fluid circulation and heating loop in fluid communication with said bearings, and having a heater means for heating said fluid, and at least one valve for controlling the -circulation of said fluid through said fluid circulation and heating loop;

a fluid-cooling circulation loop in fluid communication with said bearings, and having a chiller means for cooling said fluid, and at least one valve for controlling the circulation of said fluid through said fluid-cooling circulation loop;

a pump means for circulating said fluid through said fluid circulation and heating loop and said fluid-cooling circulation loop;

a thermostat means for monitoring the temperature of said fluid after circulating through said bearing housing means, and for selectively controlling the operation of said at least one valve of said fluid circulation and heating loop and said at least one valve of said fluid-cooling circulation loop.

12. The bearing temperature regulation system of claim 11 including a recirculation cooling loop, said recirculation cooling loop having a second pump for circulating fluid through said chiller means and back to said second pump, said recirculation cooling loop capable of independently circulating a portion of the fluid during the operation of said fluid circulation and heating loop.

13. The bearing temperature regulation system of claim 11 wherein said fluid has a specific heat of about 0.8 or greater.

14. The bearing temperature regulation system of claim 11 wherein said fluid includes ethylene glycol and water.

15. The bearing temperature regulation system of claim 11 wherein said thermostat controls the heater means.

16. The bearing temperature regulation system of claim 11 including temperature gauges in communication with said fluid circulation and heating loop and the fluid-cooling circulation loop.

17. The bearing temperature regulation system of claim 11 including flow rate control valves in communication with said fluid circulation and heating loop and the fluid-cooling circulation loop.

18. The bearing temperature regulation system of claim 11 including a plurality of bearing housing means, wherein said fluid-cooling circulation loop and said fluid circulation and heating loop are in communication with said plurality of said bearing housing means.

19. The bearing temperature regulation system of claim 11 wherein said fluid is circulated through said bearing housing means at a rate of 3 to 6 gallons per minute per bearing.

20. The bearing temperature regulation system of claim 11 wherein the temperature of the bearings fluctuates within $+/-\frac{1}{2}°$ F. temperature range during operation.

* * * * *